March 30, 1926.
S. H. EARL
1,578,589
METHOD OF CHAMFERING GEARS
Filed August 5, 1925   2 Sheets-Sheet 1
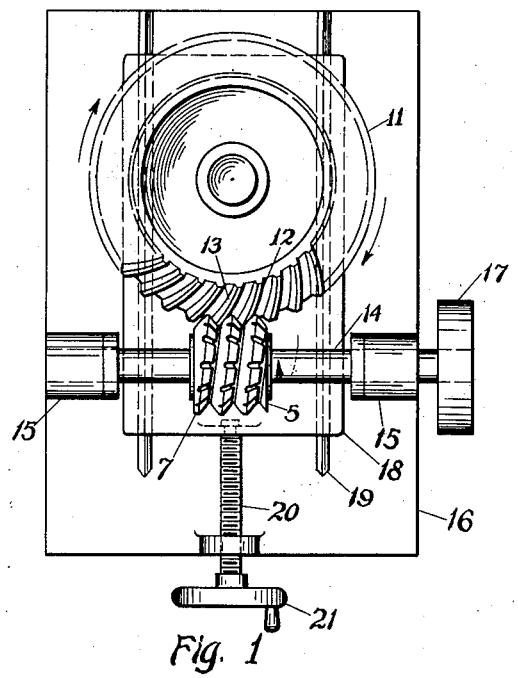
Fig. 1
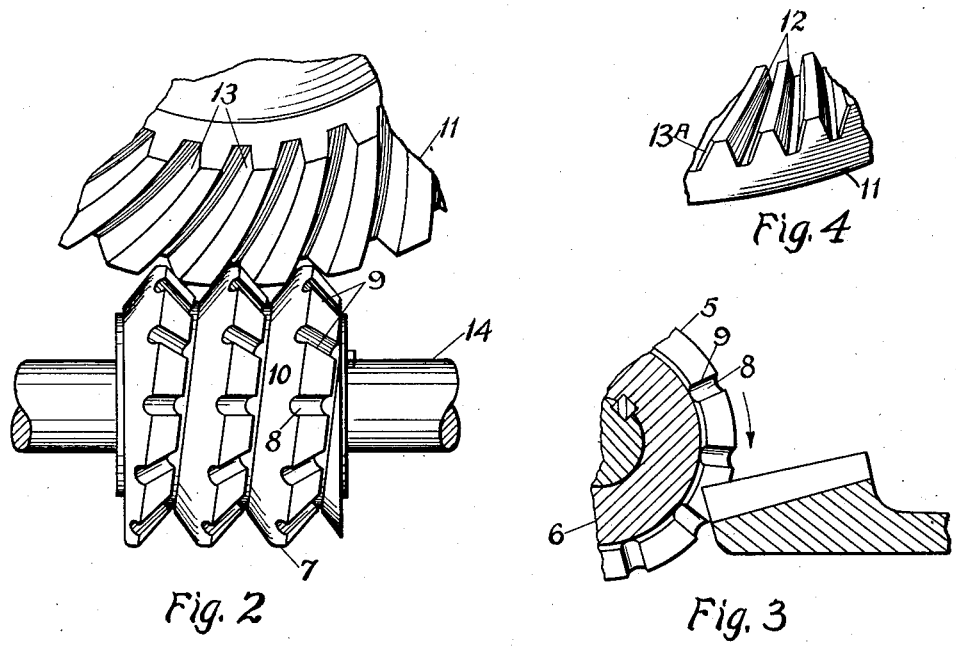
Fig. 2
Fig. 3
Fig. 4
Schuyler H. Earl INVENTOR
BY
ATTORNEY March 30, 1926.
S. H. EARL
1,578,589
METHOD OF CHAMFERING GEARS
Filed August 5, 1925   2 Sheets-Sheet 2
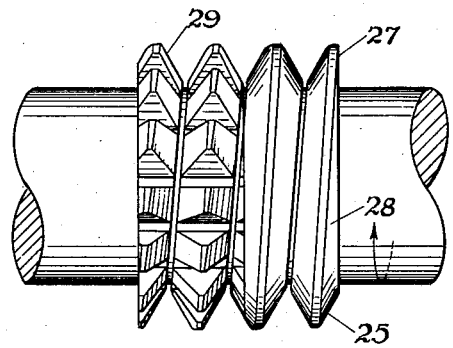
Fig. 5
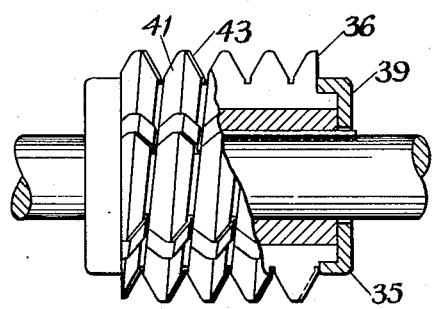
Fig. 6
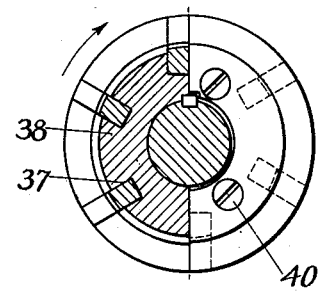
Fig. 7
Fig. 8
Fig 9
Fig. 10
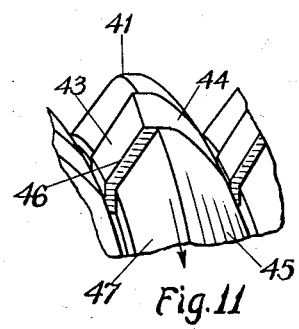
Fig. 11
Schuyler H. Earl INVENTOR
BY
ATTORNEY Patented Mar. 30, 1926.

1,578,589

UNITED STATES PATENT OFFICE.

SCHUYLER H. EARL, OF ROCHESTER, NEW YORK, ASSIGNOR TO GLEASON WORKS, OF ROCHESTER, NEW YORK, A CORPORATION OF NEW YORK.

METHOD OF CHAMFERING GEARS.

Application filed August 5, 1925. Serial No. 48,231.

*To all whom it may concern:*

Be it known that I, SCHUYLER H. EARL, a citizen of the United States, residing at Rochester, in the county of Monroe and State of New York, have invented a certain new and useful Improvement in Methods of Chamfering Gears, of which the following is a specification.

The present invention relates to methods and tools for chamfering the teeth of gears and particularly for chamfering the teeth of curved tooth or spiral bevel gears.

Despite the hardening operation to which the teeth of spiral bevel gears are usually subjected difficulty is always experienced in hardening the extreme outer ends of the concave sides of the teeth so that they will stand up in use. These ends of the teeth unless removed will chip off and the chips will get in between the teeth of the mating gears, causing noise, wear, and possible breakage. It has, therefore, been the custom for years in gear manufacturing to chamfer off the outer end of the concave sides of the teeth of spiral bevel gears. The chamfered gears operate as well as unchamfered gears and many possible difficulties are avoided. The chamfering operation has ordinarily been performed by hand. But this operation is slow because it requires that the ends of the teeth be filed individually.

One object of the present invention is to provide a tool which may be power operated and a method employing such tool which will be rapid and efficient.

A further object of the invention is to provide a tool for and a method of chamfering gears which will require a minimum of power and in operation a minimum of parts.

Still another object is to provide a method of chamfering gears which is continuous and which will insure the removal of substantially the same amount of stock from the end of each tooth of a gear.

Other objects will be apparent hereinafter from the specification and from the claims appended hereto.

While I shall describe my invention with reference to particular embodiments and with particular reference to the employment of these embodiments in the chamfering of the teeth of curved tooth gears and particularly of curved tooth bevel gears, it is to be understood that the invention is capable of further modification and of further use within its scope and the limits of the appended claims.

In the drawings:

Fig. 1 is a plan view of a machine, showing somewhat diagrammatically the method of employing my invention;

Fig. 2 is an enlarged fragmentary side elevation showing one form of tool, constructed according to my invention, in engagement with a gear to be chamfered;

Fig. 3 is a fragmentary sectional view through the tool and gear showing the manner of their engagement;

Fig. 4 is a fragmentary perspective view of the gear showing the teeth after chamfering;

Fig. 5 is a side elevation of a modified form of tool;

Fig. 6 is a side elevation, partly in section, of another form of tool;

Fig. 7 is an end elevation, partly in section, of the tool of Fig. 6;

Fig. 8 is a plan view of one of the blades used in the tool shown in Fig. 6;

Fig. 9 is a perspective view of the same;

Fig. 10 is a side elevation of said blade; and

Fig. 11 a fragmentary perspective view of the tool of Fig. 6 on an enlarged scale.

In its preferred embodiment, this invention contemplates the employment of a tool in the form of a hob and the method adopted for the chamfering of the teeth of a gear is a continuous operation. The tool employed comprises a body portion having a continuous thread and provided with a cutting edge or cutting edges which may be arranged either on one side of the thread or at one end thereof. The thread has contact with one side of the teeth of the gear to be chamfered and the cutting edge or edges are so arranged as to engage the opposite side of the teeth of said gear. When the tool and gear are engaged and the tool rotated, the driving side of the thread will engage the teeth of the gear and rotate them successively into engagement with the cutting edge or cutting edges of the tool. The operation is continuous and requires only a rotation of the tool. A machine for carrying out the operation will, therefore, be of simple construction and consume a minimum of power.

Referring to the drawings by numerals of reference, I have shown in Figures 1 to 3, one form 5 of a tool which may be employed to practice this invention and its method of use. This tool 5 consists of a body portion 6 provided with a continuous thread 7, one side of which is gashed at intervals as at 8 to provide cutting edges. This side of the thread will be relieved rearwardly of the cutting edges 9 to provide proper clearance for such edges in their cutting operation upon the teeth of the gear to be chamfered. The other side of the thread indicated at 10, will preferably be left smooth or uninterrupted.

In use the tool is engaged with the gear 11 to be chamfered to a suitable depth, as indicated in Fig. 3, and is rotated in engagement with the gear. The uninterrupted side 10 of the tool thread will engage the convex sides 12 of the gear teeth, while the cutting edges 9 will operate upon the ends of the concave tooth sides 13. When the tool is rotated on its axis the uninterrupted side will act as a worm thread and will feed the teeth of the gear successively and continuously into engagement with the cutting edges.

The chamfering operation may be performed on an ordinary milling machine or any machine suitable for the purpose. Fig. 1 shows, somewhat diagrammatically, the manner of positioning the tool 5 and the toothed blank 11 upon such a machine and the general construction thereof. The tool 5 is mounted on a spindle 14 supported in bearings 15 on the frame 16 and rotated by the pulley 17. The blank 11 is rotatably mounted on a slide 18 reciprocable on ways 19 provided on the frame. A screw 20 and a hand wheel 21 are provided for reciprocating the slide 18 to position the blank in engagement with the tool. After the blank has been moved into engagement with the tool, power can be applied to the pulley 17 and the tool will automatically and by its own rotation alone, feed the blank and chamfer its teeth. A gear 11 having its teeth chamfered at 13ª is shown in Figure 4.

To insure the greatest efficiency in operation, it is preferable to make the pitch of the tool thread equal to the pitch, at the outside, of the gear to be chamfered.

In certain cases it may be preferred to employ a tool such as shown at 25 in Fig. 5. The body portion is again provided with a continuous thread 27, but the driving and cutting portions of this thread are formed separately. The driving portion 28 consists of an ordinary worm thread, while the cutting portion 29 consists of a thread gashed and relieved to form cutting edges. Where this tool 25 is employed to chamfer the teeth of a spiral bevel gear such as shown at 11 in Figs. 1 to 3 only one side of the cutting portion 29 will be provided with cutting edges. The driving and cutting portions may be formed integral or may be formed as separate members and keyed together. This tool will be engaged with a gear to be chamfered in the same manner as the tool shown in Figs. 1 to 3 and its operation will be substantially the same as that tool.

A further embodiment of a tool formed according to this invention is shown at 35 in Figs. 6 to 11. This tool is provided with removable blades or cutting members so that the cutting portions may be readily resharpened.

In the embodiment shown a plurality of blades 36 are employed which are adapted to be inserted in slots 37 in the body 38 and held in position on said body by caps 39 secured at either end to said body by the screws 40. The body portion 38 is formed with a thread 41 one side 45 of which acts as a driving portion similarly to the side 10 of the thread of the tool 5. The blades 36 are formed with teeth 42 which are sharpened and relieved on one side 43 only. The unsharpened side is curved on the helix of such form that when the blade is secured in position this unsharpened side 44 will lie flush with the side 45 of the thread 41, forming with the side 45 of the thread the driving portion of the tool. The sharpened side 43 is so arranged that the cutting edges 46 project beyond the adjacent side 47 of the thread 41. This tool is engaged with the gear to be chamfered and operates upon the same in substantially the same manner as the tools 5 and 25 already described.

The tool 35 may be constructed in various ways. The body 38 may be slotted and blanks from which the cutting blades are to be formed may be inserted in said slots and the body and blade blanks then threaded. The threaded blades can then be removed from the slots and sharpened and relieved on one side, when they can be replaced in the slots. If this method of constructing the tool is employed the thread 41 of the body should be so cut back on one side before reinserting the tools as to insure proper clearance for the cutting edges.

In resharpening this form of tool each blade is first removed from the body and a grinding wheel is then passed over its front or forward face. This grinding wheel instead of being passed over the whole front face, as would be the case in resharpening a double-edged tool, is only moved over a portion of such face, the portion adjacent the side 44 being untouched. Thus only the cutting side is ground back, while the side 44 is always maintained of the same length, to form with side 47 of the thread 41, no matter how far back the edge 46 has been sharpened, an uninterrupted thread surface.

While I have shown a tool 35 having a plurality of removable blades, it will be understood in certain instances only one of such blades need be employed. For small gears it is possible to chamfer the teeth by using only one or two cutting edges and it is to be understood that my invention contemplates a structure in which a thread is provided with cutting edges on a portion of one side only or in which one or two single-edged cutting blades are inserted into said thread.

While I have shown straight hobs for carrying out my invention it will be understood that the hobs may be tapered and where the size of the gear is such that a straight hob would not engage the teeth to a sufficient depth to feed the gear past the cutting edges, that a hob having a curved pitch surface, similar to a Hindley worm may be employed.

While I have described my invention with reference to particular embodiments and to particular uses, it is to be understood that the invention is capable of further modification and may be practised in various ways without departing from its intent as described in the specification and pointed out in the appended claims, and this application is intended to cover any variations, uses, or adaptations thereof, following, in general, the principles of the invention and including such departures from the present disclosure as come within known or customary practise in gear cutting and may be applied to the essential features hereinbefore, and as fall within the limits of the claims.

Having thus described my invention, what I claim is:

1. The method of chamfering gears which consists in selecting a tool provided with a continuous thread, one side of which is adapted to engage the side face of the teeth of the gear to be chamfered, and with a cutting portion whose effective cutting edge is so arranged relatively to said thread as to engage the opposite side face of the gear teeth, rotating said tool in engagement with the gear and rotating said gear solely by its engagement with the tool.

2. The method of chamfering gears which consists in selecting a tool having a cutting edge arranged to operate on one side of the gear teeth only and having a driving portion in the form of a continuous thread, the pitch of which is substantially equal to the pitch, at the outside, of the gear to be cut, rotating said tool in engagement with the blank, and rotating said blank solely by its engagement with the tool.

3. The method of chamfering gears which consists in rotating in engagement with a gear a tool comprising a body having a cutting portion arranged thereon and provided with a continuous thread adapted to mesh with the gear to be chamfered and drive the same.

4. The method of chamfering gears which consists in rotating the teeth of the gear into engagement with a cutting edge by a member provided with a continuous thread the pitch of which is equal to the pitch, at the outside, of the gear to be chamfered.

5. The method of chamfering gears which consists in feeding the gear past a continuously rotating tool by rotating in engagement with the gear to be chamfered a gear which meshes therewith.

6. The method of chamfering gears which consists in rotating in engagement with the gear to be chamfered a tool having a cutting portion and a driving portion for rotating the teeth of said gear successively and continuously into engagement with said cutting portion.

7. The method of chamfering gears which consists in rotating in engagement with a gear a tool having a cutting portion and a driving portion arranged on opposite sides of a continuous thread, the pitch of which is substantially equal to the pitch, at the outside, of the gear to be chamfered.

8. The method of chamfering gears which consists in rotating in engagement with the gear a tool having a body provided with a worm thread, one portion of which is gashed and relieved to form cutting edges and rotating said gear solely by its engagement with said tool.

9. The method of chamfering gears which consists in rotating in engagement with the gear a tool of general gear form having cutting edges arranged in a continuous helix and rotating said gear solely by the engagement of the tool therewith.

10. The method of chamfering gears which consists in rotating a tool formed with a continuous thread one face of which is gashed to provide a cutting edge and the other face of which is uninterrupted to act as a driver, in engagement with a toothed blank and rotating the blank solely by its engagement with the tool.

SCHUYLER H. EARL.